L. TOWNSEND.
VEHICLE HOIST.
APPLICATION FILED MAY 6, 1915.
1,175,487.
Patented Mar. 14, 1916.
2 SHEETS—SHEET 1.
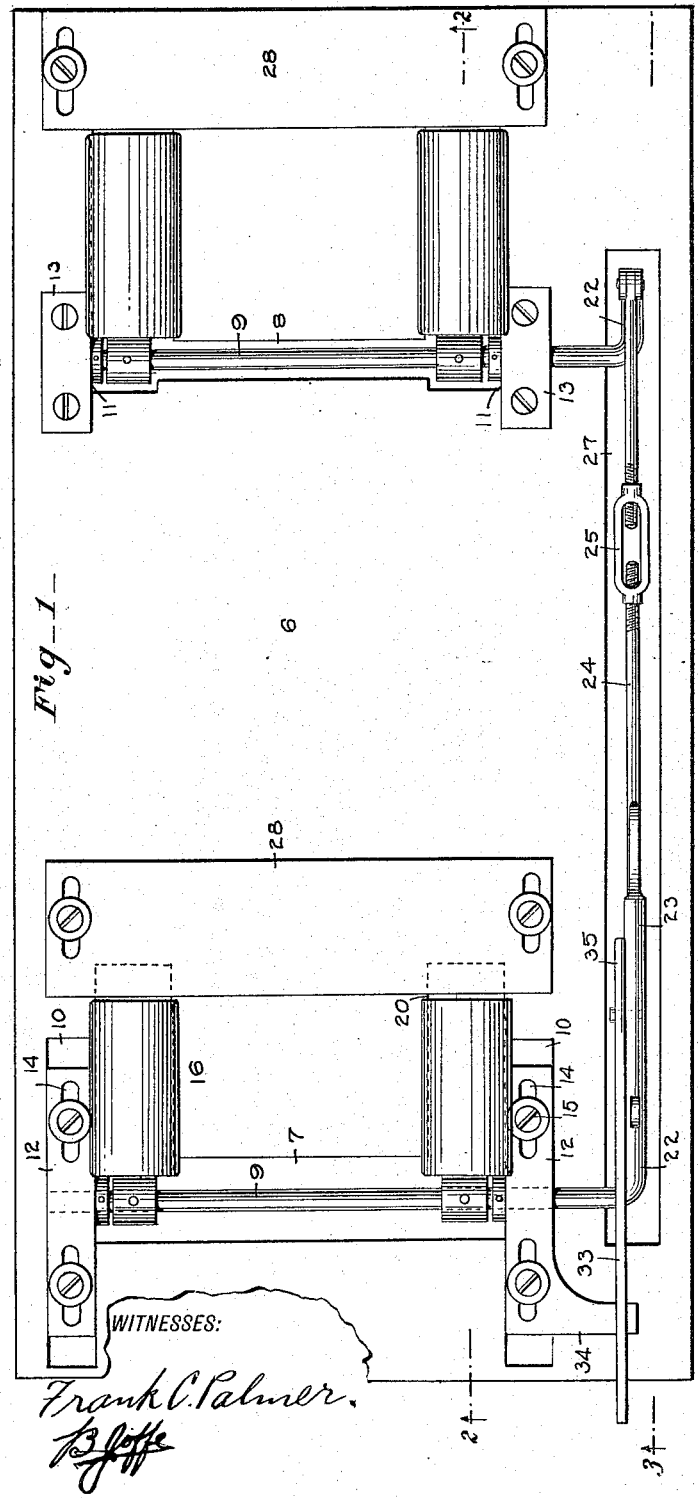
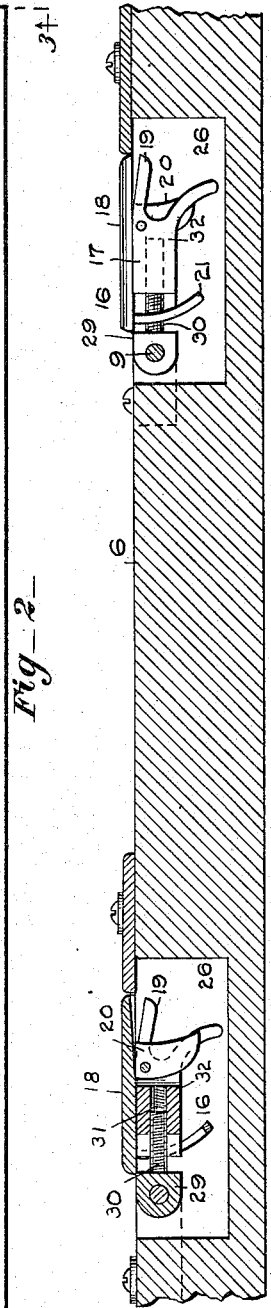
WITNESSES:
Frank C. Palmer.
B. Joffe
INVENTOR
Louis Townsend.
BY
ATTORNEY

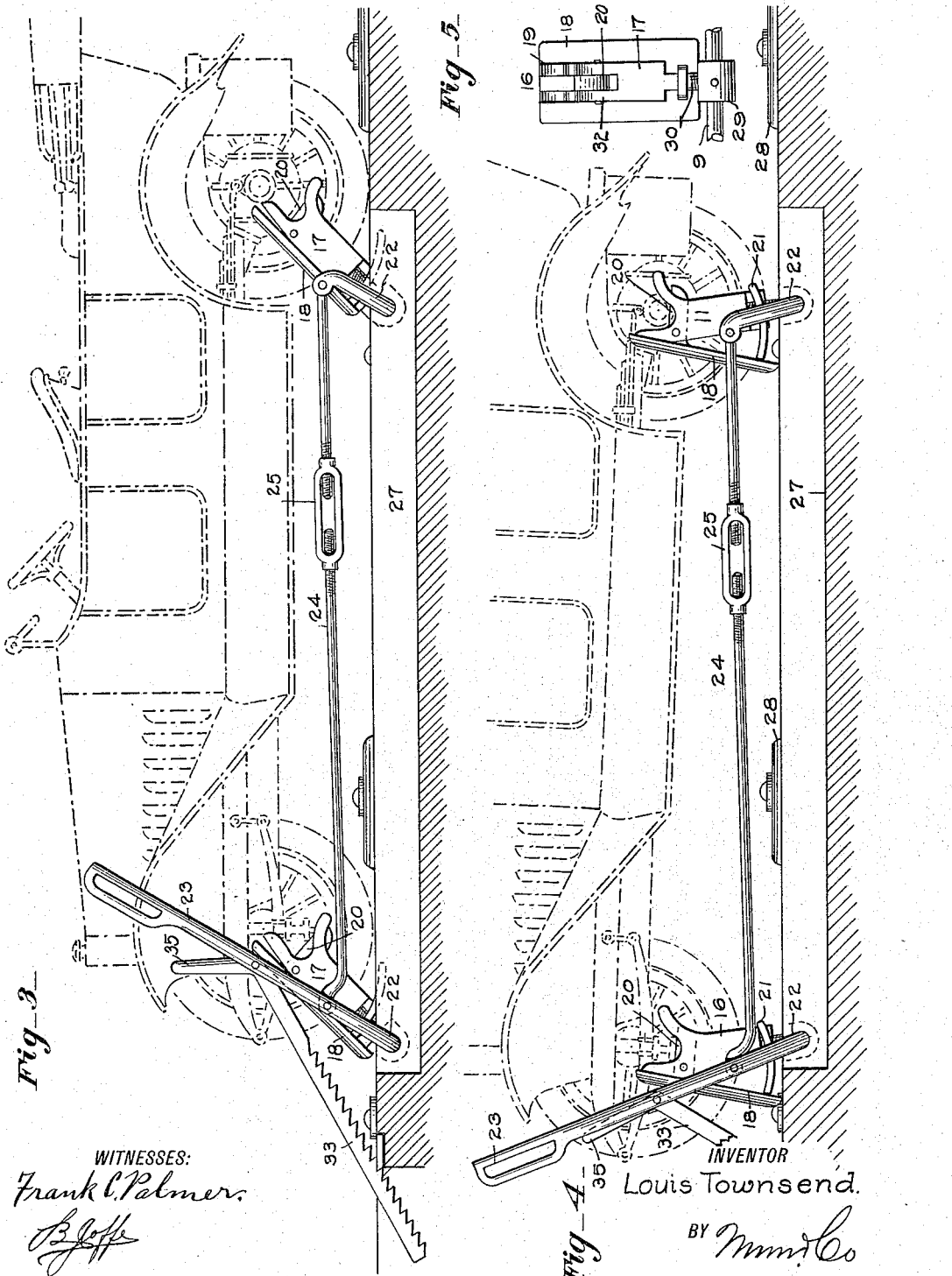

UNITED STATES PATENT OFFICE.

LOUIS TOWNSEND, OF EVANSVILLE, INDIANA, ASSIGNOR OF ONE-HALF TO DEAN McLAUGHLIN, OF TERRE HAUTE, INDIANA.

VEHICLE-HOIST.

1,175,487.     Specification of Letters Patent.     Patented Mar. 14, 1916.

Application filed May 6, 1915. Serial No. 26,233.

*To all whom it may concern:*

Be it known that I, LOUIS TOWNSEND, a citizen of the United States, and a resident of Evansville, in the county of Vanderburg and State of Indiana, have invented a new and Improved Vehicle-Hoist, of which the following is a full, clear, and exact description.

My invention relates to vehicle hoists, and has reference more particularly to hoisting means whereby an automobile can be raised slightly from the ground.

The object of the invention is to provide a vehicle hoist which can be easily adjusted to various lengths of vehicle wheel bases, and whereby the height to which the vehicle can be raised can be also adjusted.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a plan view of an embodiment of my invention; Fig. 2 is a section on line 2—2, Fig. 1; Fig. 3 is a section on line 3—3, Fig. 1, the hoist being shown in position when the same is to be engaged by an automobile, which is shown in said figure in dotted line; Fig. 4 is a similar section showing the hoist in operative position, the supported automobile being shown in dotted line; and Fig. 5 is a detail structure of the horse of the hoist.

Referring to the drawings, 6 represents a platform or floor which is provided with transverse grooves 7 and 8, each adapted to accommodate a rocking shaft 9 therein. Longitudinal grooves 10 and 11 are provided at the ends of the grooves 7 and 8 respectively. Bearings 12 are provided within the grooves 10 for the shaft 9; and bearings 13 are provided within the grooves 11 for the other shaft 9. The bearings 13 fit tightly into the grooves 11, while the bearings 12 are adjustable longitudinally therein, so that the shaft 9 within the groove 7 can be adjusted relative to the shaft 9 in the groove 8. For this purpose the bearings 12 are provided with longitudinal slots 14 through which screws 15 pass that secure the bearings to the platform 6.

Each of the shafts 9 carries a pair of foldable horses 16 suitably spaced. Each of the horses comprises two members 17 and 18. The member 17 is rigidly secured to the shaft 9 at its base. The top thereof is forked, as shown at 19, to engage the axle of the vehicle. The member 18 is in the shape of a brace having a tongue 20 adjacent the top thereof which is pivoted to the horse 16 so that a portion of the tongue 20 is above the bottom of the forked portion 19. The forked end adjacent the member 18 is bent therefrom, as best shown in Fig. 2, to cause the lower end of said member 18 to move away from the bottom of the member 17 when an axle engages the tongue 20, as best shown in Fig. 4. The movement of the brace 18 is limited by a loop 21 secured to the lower end of the brace 18, which loop encompasses the lower end of the member 17.

Each of the shafts 9 has a crank 22. One of the cranks is extended to form a handle 23. A rod 24 having a turn-buckle 25 ties the two cranks 22 together. The turn-buckle 25 permits the adjustment of the rod 24 when the distance between the shafts 9 is varied. The platform 6 is provided with recesses 26 for each of the horses 16, to accommodate them when the hoist is in inoperative position, as shown in Figs. 1 and 2. A recess 27 is also provided for the cranks and rod. The platform 6 has wearing plates 28 located in front of the recesses 26. The plate 28 adjacent the rear horses is made adjustable to cover that part of the recesses 26 which is not occupied by the horses during their inoperative position, the said recesses 26 are made long enough to permit the adjustment of the shaft 9 within the recesses as previously stated. This is necessary to permit the adjustment of the hoist for different sizes of vehicle wheel bases.

Each of the members 17 of the horses is formed of two sections, the lower section 29, which is secured to the shaft, has a threaded stem 30 engaged by a threaded recess 31 provided in the upper section 32 of the part 17. Thus the part 17 can be varied in length by turning it on the stem 30, and as can be easily seen, the member 18 will not interfere with the turning movement of the upper section 32 when the horses are placed into operative position. This structure permits the adjustment of the horses for various heights of vehicle axles. To facilitate the hoisting of a vehicle, the handle 23 is provided with a rack 33 which is pivotally connected to the handle, and the teeth of which rack are adapted to engage a plate 34 forming an extension of the adjacent bearing 12. As the hoist is moved to the operative position, the teeth of the rack 33 prevent the apparatus from returning to its inoperative position under the weight which is raised. This arrangement permits the raising of the vehicle in successive steps. The rack 33 has an extension 35 disposed at an angle to the rack and which forms a handle therewith, whereby the rack is prevented from engagement with the plate 34 when the vehicle is moved from the horses on to the platform.

The operation of my device is as follows: The vehicle to be hoisted is moved on to the platform to bring the front and rear axles of the vehicle in position to be engaged by the forked ends of the member 16. It is self-evident that the distance between the front and rear horses, as well as their height, must be previously adjusted to correspond with the vehicle to be hoisted. The handle 23 is then pulled to raise the horses. The forked ends of the member 16 come into engagement with the axles and move the same. When the tongue 20 is engaged by the axle, the lower end of the member 18 will be forced away from the lower end of the member 17. The further movement of the horses will bring the lower end of the brace members 18 against the platform; and the relation between the brace member 18 and the member 16 is such that when said member touches the platform with its lower edge, the resultant of the automobile weight on each horse will fall between members 18 and 16, rendering the contrivance stable. To bring the vehicle on to the platform, the handle 23 is moved in the opposite direction, and as the axles of the vehicle are disengaged from the forked end, gravity will bring the member 18 against the member 16 while the apparatus is moved to the inoperative position.

When the contrivance is to be fixed, the same can be mounted directly on a floor, in place of providing the same on a platform; but, preferably, the apparatus is mounted on a platform as described, and the platform, if desired, can be mounted on rolling members so that the same can be easily transported.

From the above description it will be seen that my device comprises foldable horses mounted to rock. The foldable parts of the horses are normally folded together; and when weight is applied to the horses they are unfolded into operative position with the weight carried thereby falling between the foldable parts to render them stable.

While I have described the principle of operation, together with the device which I now consider to be the best embodiment thereof, I desire to have it understood that the device shown is merely illustrative and that such changes may be made as are within the scope of the appended claims.

I claim:

1. In a vehicle hoist, a platform, a plurality of horses mounted to rock on the platform and each having swinging legs, and means for rocking the horses whereby they can be placed into operative or into inoperative position, each of said horses having means operable by the weight applied to the horses to swing the horse's legs apart.

2. In a vehicle hoist, a platform, a plurality of horses mounted to rock on the platform, means for bringing said horses into operative or into inoperative position, each of said horses having longitudinally foldable legs, the foldable legs having means adapted to be engaged by the weight applied to the horses, whereby the legs are unfolded.

3. In a vehicle hoist, a platform, horses associated with the platform and each having a part mounted to rock on the platform, and means for rocking simultaneously the said parts of the horses whereby the said horses may be placed into operative or into inoperative position, the other part of each horse being pivotally connected to the first and having means operable by the weight applied to the horse, whereby the said pivotal part is displaced from the first part, said other part being adapted to rest on the platform when the horses are in operative position.

4. In a vehicle hoist, a platform, horses associated with the platform, each of said horses having a part mounted to rock on the platform, a second part hinged to the first part of the horse adjacent the top thereof, means for actuating simultaneously said rocking parts of the horses, whereby said horses may be placed into operative or into inoperative position, the said hinged parts of the horses having means adapted to be engaged by the weight to be supported by the horses when the same are moved into operative position, whereby the lower end of said hinged part is moved away from the lower end of the rocking part of the horse, and means limiting the movement of the lower end of said hinged part, said lower end of the hinged part adapted to engage the platform when said horses are in operative position.

5. In a vehicle hoist, a platform, a plurality of horses mounted to rock on the platform, each of said horses having foldable legs means for rocking the horses whereby the same can be placed into operative or into inoperative position, each of said horses having means for unfolding the legs operable by the weight applied to the horses, and means limiting the unfolding of the legs, substantially as and for the purpose set forth.

6. In a vehicle hoist, a platform, horses associated with the platform, each of said horses having two parts hinged at the top thereof, one of said parts being mounted to rock at the lower end thereof on the platform, means for actuating said rocking parts whereby the horse can be placed into operative or into inoperative position, the other part of the horse having an extension adjacent the top adapted to be engaged by the weight the horses are to support, whereby the lower end of said second part is moved from the lower end of the first part, and a loop carried by said second part and encompassing said first part which is mounted to rock, whereby the displacement of the lower end of said second part is limited, the lower end of said second part being adapted to engage the platform when said horses are placed into operative position.

7. In a vehicle hoist, a platform, horses associated with the platform, each having a part mounted to rock on the platform, means for varying the length of said part, each of said horses having a second part hinged to the first part, said second part having means operable by the weight applied to the horse whereby said second part is swung on its pivot, means limiting the swinging movement of said second part relative to the first part, and means for actuating the rocking parts of the horses whereby said horses may be placed into operative or into inoperative position.

8. In a vehicle hoist, a platform, horses associated with the platform, each of said horses having a part mounted to rock on the platform and a second part hinged to the first part of the horses adjacent the top thereof, the rocking part of the horses having a forked end adapted to engage an axle of a vehicle, the hinged part of the horse having a tongue within the forked end adapted to be engaged by the axle when the same enters the forked end, whereby said hinged part of the horse is swung on its pivot, means limiting the swinging movement of said hinged part, and means for actuating the rocking parts of the horses whereby the horses may be placed into operative or into inoperative position on said platform.

9. In a vehicle hoist, a platform, a horse at the front and rear of the platform, said horses being normally flush with the surface of the platform, means for bringing said horses above the platform surface, means for varying the distance between the front and rear horses, each of the horses having foldable legs, and means operable by the weight to be supported by the horses to unfold the legs, and means limiting the unfolding movement of the horse's legs.

10. In a vehicle hoist, a platform, shafts mounted to rock in the platform, means for rocking the shafts, means for adjusting one of said shafts relative to the other on the platform, whereby the distance therebetween may be varied, a pair of horses carried by each of said shafts, said platform having recesses to accommodate the horses therein, each of said horses comprising a part secured to the shaft and a part hinged to the part secured to the shaft, the part secured to the shaft having a forked end adapted to be engaged by a vehicle axle, the hinged part having a tongue at the forked end engageable by the axle and whereby the hinged part is caused to swing relative to the secured part, and a loop carried by said hinged part and engaging the secured part, whereby the swinging movement of said hinged part relative to said secured part is limited, said hinged part being adapted to engage the platform with its lower end when the horse is brought into operative position.

11. In a vehicle hoist, a horse having relatively movable legs and means forming part of one of the legs and coöperating with the supporting surface of the horse to be engaged by the weight placed on the horse, and whereby the two legs are moved apart.

12. In a vehicle hoist, a horse having pivotally connected legs adjacent the weight-supporting surface of the horse, and means engageable by weight placed on the supporting surface of the horse to swing the legs apart.

In testimony whereof I have signed my name to this specification in the presence of two subscribing witnesses.

LOUIS TOWNSEND.

Witnesses:
WILLIAM S. HENRICH,
SEBASTEAN HENRICH.

Copies of this patent may be obtained for five cents each, by addressing the "Commissioner of Patents, Washington, D. C."